(12) United States Patent
Komatsu

(10) Patent No.: US 8,509,950 B2
(45) Date of Patent: Aug. 13, 2013

(54) CONTROL APPARATUS AND CONTROL METHOD FOR ROBOT, ROBOT, AND CONTROL PROGRAM THEREFOR

(75) Inventor: Mayumi Komatsu, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/611,686

(22) Filed: Sep. 12, 2012

(65) Prior Publication Data

US 2013/0006422 A1   Jan. 3, 2013

Related U.S. Application Data

(63) Continuation of application No. PCT/JP2011/006817, filed on Dec. 6, 2011.

(30) Foreign Application Priority Data

Dec. 8, 2010 (JP) .................................. 2010-273535

(51) Int. Cl.
*G05B 19/04* (2006.01)
*G05B 19/18* (2006.01)
*G05B 15/00* (2006.01)
*G05B 19/00* (2006.01)

(52) U.S. Cl.
USPC ........... 700/261; 700/252; 700/257; 700/258; 700/260; 901/9; 901/15

(58) Field of Classification Search
None
See application file for complete search history.

(56) References Cited

U.S. PATENT DOCUMENTS

| 5,994,864 | A | * | 11/1999 | Inoue et al. | ................. 318/568.2 |
| 6,127,792 | A | * | 10/2000 | Kamiya et al. | ................. 318/432 |
| 6,917,856 | B2 | | 7/2005 | Murata | |
| 8,335,591 | B2 | * | 12/2012 | Takahashi | ..................... 700/260 |
| 2011/0082587 | A1 | * | 4/2011 | Ziaei et al. | ..................... 700/260 |

FOREIGN PATENT DOCUMENTS

| JP | 63-8912 | 1/1988 |
| JP | 5-111889 | 5/1993 |
| JP | 2000-6065 | 1/2000 |
| JP | 2002-219675 | 8/2002 |
| JP | 2009-113147 | 5/2009 |
| JP | 2012-51042 | 3/2012 |
| WO | 03/086718 | 10/2003 |

OTHER PUBLICATIONS

International Search Report issued Mar. 13, 2012 in International (PCT) Application No. PCT/JP2011/006817.

* cited by examiner

*Primary Examiner* — Khoi Tran
*Assistant Examiner* — Bao Long T Nguyen
(74) *Attorney, Agent, or Firm* — Wenderoth, Lind & Ponack, L.L.P.

(57) ABSTRACT

A desired joint torque output limiting unit limits operations of a desired joint torque output unit and a limit cancellation unit cancels the limitation by the output limiting unit. An actuator of a joint of a robot is controlled in accordance with modified desired joint torque outputted from the output limiting unit, so that the robot can be controlled even upon switching between dynamics parameters.

8 Claims, 9 Drawing Sheets

CONTROL APPARATUS AND CONTROL METHOD FOR ROBOT, ROBOT, AND CONTROL PROGRAM THEREFOR

CROSS-REFERENCE TO RELATED APPLICATIONS

This is a continuation application of International Application No. PCT/JP2011/006817, filed Dec. 6, 2011, which claims priority of Japanese Patent Application No.: 2010-273535 filed on Dec. 8, 2010, the content of which is incorporated herein by reference.

BACKGROUND OF THE INVENTION

1. Technical Field

The technical field relates to a control apparatus and a control method for a robot, for use in controlling operations of a robot conveying an object. The technical field also relates to a robot and a control program therefor.

2. Background Art

In recent years, domestic robots such as nursing care robots or housekeeping support robots have been developed extensively. Also as industrial robots, active development of robots cooperating with persons has been observed due to increase in cell production plants and the like. Unlike those conventional robots operating in areas separated from areas of persons, such robots cooperating with persons need to share the work areas with the persons. Accordingly, these cooperative robots are required to ensure safety of a kind different from that of the conventional industrial robots and the like.

In a robot arm as one example of a robot, an output torque of each joint is calculated from weights, the moment of inertia, and the like of an object being conveyed and the robot arm itself. The torque required to each joint when an object is gripped is different from the torque required when no object is gripped. It is thus necessary to appropriately switch desired torques in accordance with a condition whether or not an object is gripped.

When the robot grips an object while being stopped, the weights, the moments of inertia, and the like are switched between the two states where the object is gripped and is not gripped. The output torque is accordingly switched and the robot arm inevitably operates in some cases although a desired position of the robot arm is unchanged, which is problematic in terms of safety.

Upon the switching between weights, the moments of inertia, and the like in a robot for gripping an object, Patent Literature 1 discloses a control apparatus that controls a robot not by performing calculation while switching between the weights, the moments of inertia, and the like, but by adding a feedforward term (see Patent Literature 1).

CITATION LIST

Patent Literature

Patent Literature 1: JP S63-8912 A

SUMMARY OF THE INVENTION

The technique according to Patent Literature 1 includes the operation of switching between two states of adding and not adding calculation of such a feedforward term. However, Patent Literature 1 has no solution to the case where the robot inevitably operates upon such a switching operation.

One non-limiting and exemplary embodiment provides a control apparatus and a control method for a robot, a robot, and a control program therefor, which enable the robot to be kept stopped even upon switching between dynamics parameters (such as a weight and the moment of inertia of a gripped object) when the object is gripped or released.

In one general aspect, the techniques disclosed here feature: that a control apparatus for a robot comprising a joint, the control apparatus comprises:

a dynamics parameter acquisition unit that acquires a plurality of dynamics parameters for the robot and an object gripped by the robot;

a desired joint torque output unit that outputs, as a desired joint torque, a desired value of torque of the joint of the robot;

a dynamics parameter switching unit that switches between the plurality of dynamics parameters acquired by the dynamics parameter acquisition unit;

a desired joint torque output limiting unit that limits an output of the desired joint torque from the desired joint torque output unit after the dynamics parameter switching unit switches between the dynamics parameters; and a limit cancellation unit that cancels a limitation by the desired joint torque output limiting unit.

These general and specific aspects may be implemented using a system, a method, and a computer program, and any combination of systems, methods, and computer programs.

In the control apparatus and the control method for a robot, as well as the robot and the control program therefor according to the present invention, even upon switching between the dynamics parameters such as the weight including the weight of the gripped object or the moment of inertia when the robot grips or releases the object, the output of the desired joint torque from the desired joint torque output unit can be limited by the desired joint torque output limiting unit or the limitation by the desired joint torque output limiting unit can be cancelled by the limit cancellation unit. As a result, the robot can be controlled so as to be kept stopped or to be continuously stopped.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

These and other aspects and features of the present invention will become clear from the following description taken in conjunction with the embodiments thereof with reference to the accompanying drawings, in which.

DETAILED DESCRIPTION OF THE INVENTION

Figure 1:
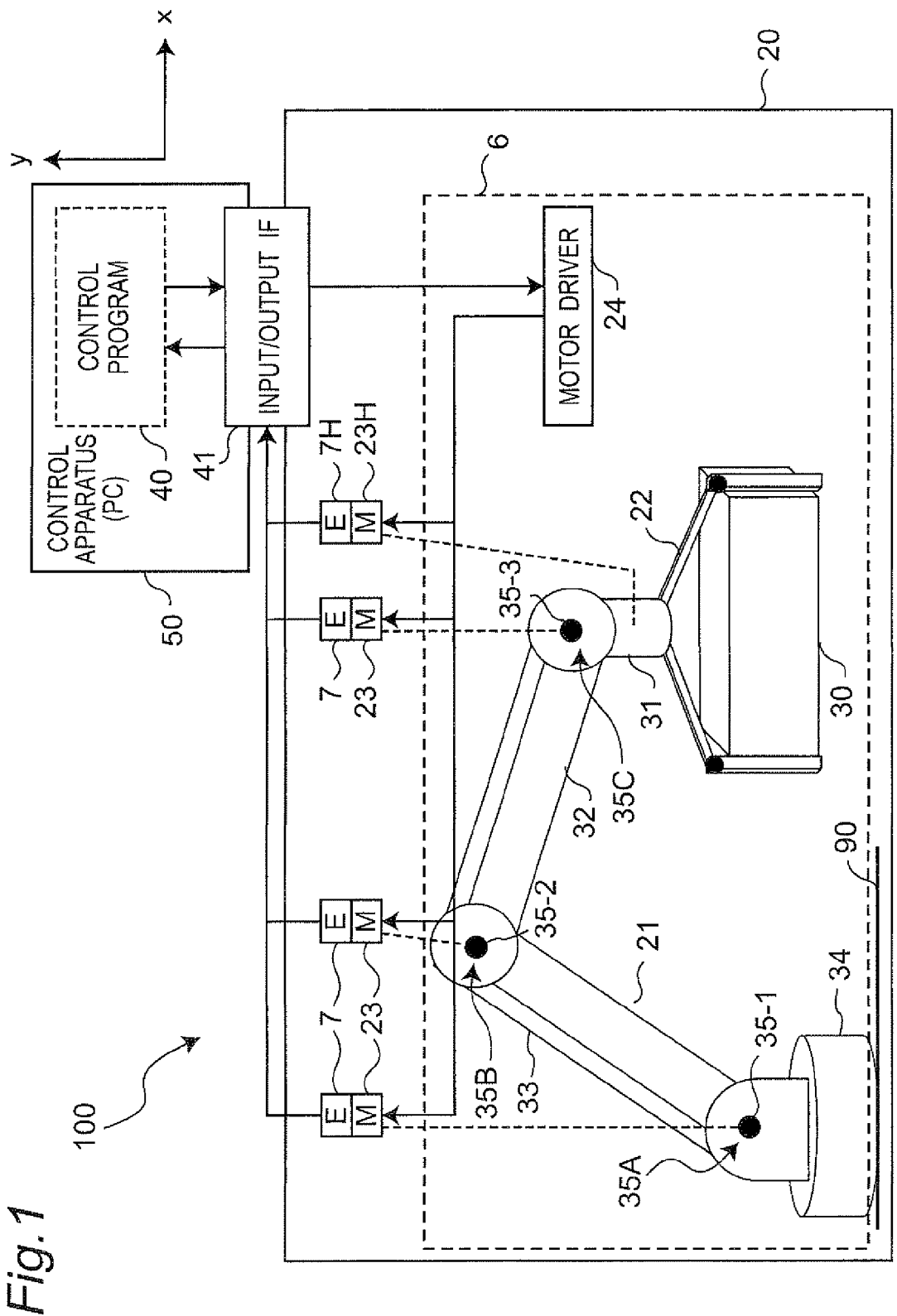
FIG. 1 is a view showing the configuration of a robot system according to a first embodiment of the present invention.

Described in detail below are embodiments of the present invention with reference to the drawings.

Prior to detailing the embodiments of the present invention with reference to the drawings, reference is made to various aspects of the present invention.

According to a first aspect of the present invention, there is provided a control apparatus for a robot comprising a joint, the control apparatus comprising:

a dynamics parameter acquisition unit that acquires a plurality of dynamics parameters for the robot and an object gripped by the robot;

a desired joint torque output unit that outputs, as a desired joint torque, a desired value of torque of the joint of the robot;

a dynamics parameter switching unit that switches between the plurality of dynamics parameters acquired by the dynamics parameter acquisition unit;

a desired joint torque output limiting unit that limits an output of the desired joint torque from the desired joint torque output unit after the dynamics parameter switching unit switches between the dynamics parameters; and a limit cancellation unit that cancels a limitation by the desired joint torque output limiting unit.

According to a second aspect of the present invention, there is provided the control apparatus for a robot according to the first aspect, wherein, immediately after the dynamics parameters are switched, the desired joint torque output limiting unit maintains the output of the desired joint torque from the desired joint torque output unit immediately before the dynamics parameters are switched.

According to a third aspect of the present invention, there is provided the control apparatus for a robot according to the first aspect, further comprising:

a robot shift detection unit that detects shift of the robot; wherein the desired joint torque output limiting unit maintains the desired joint torque outputted from the desired joint torque output unit at a moment when the robot shift detection unit detects shift of the robot.

According to a fourth aspect of the present invention, there is provided the control apparatus for a robot according to any one of the first to third aspects, further comprising:

a desired angle generation unit that generates and outputs a desired joint angle vector that is used to achieve a desired operation of the robot; wherein the desired joint angle vector outputted from the desired angle generation unit is used when the desired joint torque output unit outputs the desired value of the torque of the joint of the robot as the desired joint torque, and the limit cancellation unit cancels the limitation on the output of the desired joint torque from the desired joint torque output unit when determined that a desired position of the robot is changed in accordance with the desired joint angle vector outputted from the desired angle generation unit.

According to a fifth aspect of the present invention, there is provided the control apparatus for a robot according to any one of the first to third aspects, wherein the limit cancellation unit further comprises a force detection unit that detects force externally applied to the robot, and the force detection unit cancels the limitation on the output of the desired joint torque from the desired joint torque output unit when the force detection unit detects a force of a magnitude equal to or more than a threshold.

According to a sixth aspect of the present invention, there is provided the control apparatus for a robot according to any one of the first to third aspects, wherein the limitation on the output by the desired joint torque output limiting unit is not applied to a joint moving in a vertical direction in the robot.

According to a seventh aspect of the present invention, there is provided the control apparatus for a robot according to any one of the first to third aspects, wherein the dynamics parameter switching unit comprises an object grip detection unit that detects that the object is gripped by the robot, and the dynamics parameter switching unit switches between the dynamics parameters after the object grip detection unit detects that the object is gripped.

According to an eighth aspect of the present invention, there is provided a robot comprising:

the control apparatus according to any one of the first to third aspects for the robot;

a robot arm including the joint; and a hand that is supported at a distal end of the robot arm and is capable of gripping the object.

According to a ninth aspect of the present invention, there is provided a method of controlling a robot including a joint, the method comprising:

acquiring, by a dynamics parameter acquisition unit, a plurality of dynamics parameters for the robot and an object gripped by the robot;

outputting, from a desired joint torque output unit, a desired value of torque of the joint of the robot as a desired joint torque;

switching, by a dynamics parameter switching unit, between the plurality of the dynamics parameters acquired by the dynamics parameter acquisition unit;

limiting, by a desired joint torque output limiting unit, the output of the desired joint torque from the desired joint torque output unit after the dynamics parameter switching unit switches between the dynamics parameters; and canceling, by a limit cancellation unit, the limitation by the desired joint torque output limiting unit.

According to a tenth aspect of the present invention, there is provided a control program for a control apparatus of a robot including a joint, the control program causing a computer to function as:

a dynamics parameter acquisition unit that acquires a plurality of dynamics parameters for the robot and an object gripped by the robot;

a desired joint torque output unit that outputs a desired value of torque of the joint of the robot as a desired joint torque;

a dynamics parameter switching unit that switches between the plurality of dynamics parameters acquired by the dynamics parameter acquisition unit;

a desired joint torque output limiting unit that limits the output of the desired joint torque from the desired joint torque output unit after the dynamics parameter switching unit switches between the dynamics parameters; and a limit cancellation unit that cancels the limitation by the desired joint torque output limiting unit.

Described in detail below are the embodiments of the present invention with reference to the drawings.

First Embodiment

FIG. 1 shows the configuration of a robot system 100 including a robot 20 according to a first embodiment of the present invention. The robot system 100 includes a control apparatus 50 and the robot 20 to be controlled thereby. The robot 20 further includes a robot mechanism 6 configured by a robot arm 21, a hand 22, and a motor driver 24; motors 23 and 23H each serving as one example of an actuator; and encoders 7 and 7H. The robot 20 has a function of gripping an object 30 with the hand 22 and conveying the object 30.

The control apparatus 50 according to the first embodiment is configured by an ordinary personal computer, for example. The control apparatus 50 includes a control program 40 and an input/output IF 41. The input/output IF (interface) 41 includes a D/A board, an A/D board, a counter board, etc., each of which is connected to an expansion slot of a PCI bus or the like of the personal computer.

The control apparatus 50 is connected to the motor driver 24 for the motors 23 and 23H by way of the input/output IF 41 that serves as one example of an input unit, and transmits a control signal to the motor driver 24. The motors 23 and 23H independently drive respective links 33, 32, and 31 of the robot arm 21 as well as a manipulator (hand) 22 in the robot mechanism 6.

The motor driver 24 drives and controls independently each of the motors 23 in accordance with a control signal. The motors 23 each serve as one example of a rotation drive device or an actuator for use in driving a joint. The motor driver 24 and each of the motors 23 collectively function as an example of a drive unit for driving a corresponding joint. The encoders 7 each serve as one example of an angle detection unit for use in driving a joint, and each output angle information. Each of the encoders 7 detects a rotation phase angle (in other words, a joint angle) of a rotary shaft of a corresponding one of the motors 23. The motor driver 24 also drives and controls, in accordance with a control signal, the motor 23H that serves as one example of a rotation drive device for use in driving the hand. The motor driver 24 and the motor 23H collectively function as an example of a drive unit for driving the hand. The encoder 7H serves as one example of an angle detection unit for use in driving the hand, and outputs angle information. The encoder 7H detects a rotation phase angle (in other words, a joint angle) of a rotary shaft of the motor 23H.

The control apparatus 50 controls operations of the robot arm 51, and receives, by way of the counter board of the input/output IF 41, the angle information on each joint, which is outputted from the corresponding one of the encoders 7 for the joints of the robot arm 21. The control apparatus 50 calculates a control command value for the rotating operation of each of the joints, from the angle information on each of the joints thus received. The control apparatus 50 transmits, by way of the D/A board of the input/output IF 41, the control command values to the motor driver 24 for driving and controlling the respective joints of the robot arm 21, so as to drive the motors 23 of the respective joints of the robot arm 21.

The robot arm 21 may be a multiple link manipulator of three degrees of freedom as one example, and the hand 22 can be attached to a distal end of the robot arm 21. The robot arm 21 includes the third link 31, the second link 32, the first link 33, and a pedestal 34. The hand 22 is attached to a distal end of the third link 31. The second link 32 has a distal end connected to the third link 31 with a third joint 35C being located therebetween. The first link 33 has a distal end connected to the second link 32 with a second joint 35B being located therebetween such that the distal end of the first link 33 is rotatably coupled to a proximal end of the second link 32. The first link 33 is connected to the pedestal 34 with a first joint 35A being located therebetween. The first link 33 has a proximal end rotatably coupled to and supported by the pedestal 34 that is fixed to a floor 90.

The robot arm 21 has a first joint shaft 35-1, a second joint shaft 35-2, and a third joint shaft 35-3. The first joint shaft 35-1 rotates positively or negatively within an xy plane that includes an x axis and a y axis provided perpendicular to each other. The second joint shaft 35-2 and the third joint shaft 35-3 also rotate positively or negatively within the xy plane, respectively. The first joint shaft 35-1, the second joint shaft 35-2, and the third joint shaft 35-3 serve as rotary shafts of the first joint 35A, the second joint 35B, and the third joint 35C of the robot arm 21, respectively. Thus, the robot arm 21 configures the multiple link manipulator of three degrees of freedom, which is rotatable independently about the three shafts in total, namely, the first to third joint shafts 35-1 to 35-3.

The joints 35A, 35B, and 35C, which respectively configure rotary units of the shafts, are each provided with a corresponding one of the motors 23 and a corresponding one of the encoders 7. The motors 23 and the encoders 7 are each provided to one of a pair of members (such as a rotary member and a support member supporting the rotary member) which configure a corresponding one of the joints 35A, 35B, and 35C. The motors 23 and the encoders 7 may be located respectively inside the joints 35A, 35B, and 35C of the robot arm 21. The rotary shaft of the motor 23 provided to one of the members configuring a corresponding one of the joints 35A, 35B, and 35C is coupled to another one of the members of the corresponding one of the joints 35A, 35B, and 35C. When the rotary shaft is rotated positively or negatively, the other one of the members is made rotatable relatively to the one of the members about the corresponding one of the shafts.

When the first link 33 is rotated positively or negatively about an axis perpendicular to the floor 90, the pedestal 34 may be divided into a fixed portion fixed to the floor 90 and a movable portion connected to the first link 33. The corresponding motor 23 and the corresponding encoder 7 may be provided to the fixed portion and the movable portion, similarly to the remaining joints, so as to be driven and controlled by way of the motor driver 24.

The hand 22 is further provided with the hand driving motor 23H (which is actually located inside the hand 22) serving as one example of a hand drive device to be driven and controlled by the motor driver 24, and the encoder 7H (which is actually located inside the hand 22) for detecting, as rotation angle information, the rotation phase angle (in other words, the joint angle) of the rotary shaft of the hand driving motor 23H. The rotation angle information detected by the encoder 7H is transmitted to a hand control unit 26 (serving as one example of an object grip detection unit) of the control apparatus 50 by way of the input/output IF 41. The hand control unit 26 of the control apparatus 50 drives and controls rotation of the hand driving motor 23H by way of the motor driver 24 in accordance with the rotation angle information detected by the encoder 7H. When the rotary shaft of the hand driving motor 23H is rotated positively or negatively, the hand 22 can be opened or closed, so that the object 30 can be gripped or released.

Figure 2:
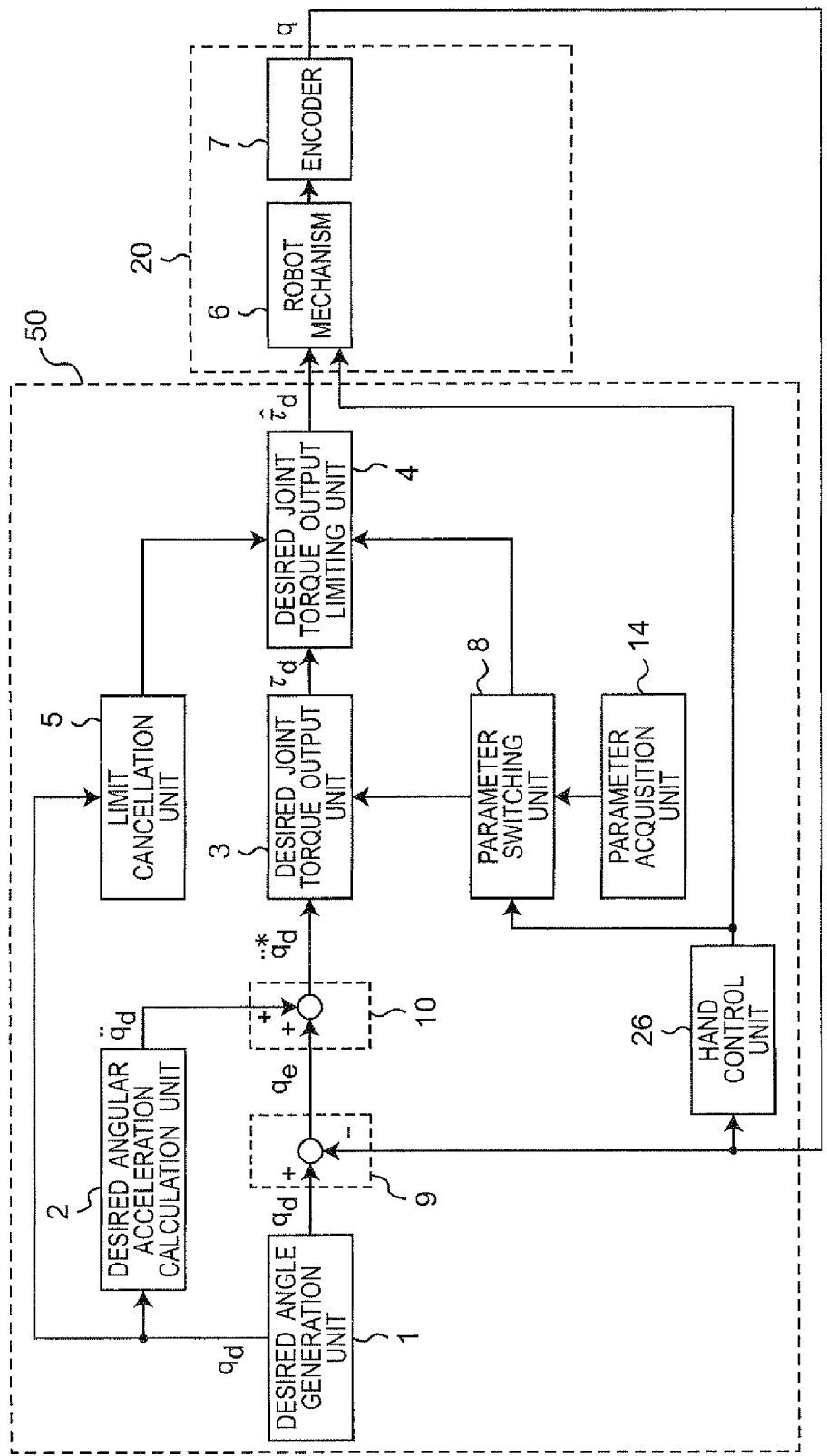
FIG. 2 is a block diagram showing a control apparatus for a robot and a part of the robot to be controlled, according to the first embodiment of the present invention.

FIG. 2 is a block diagram of the control apparatus 50 for the robot 20 and a part of the robot 20 to be controlled, according to the first embodiment of the present invention.

The control apparatus 50 includes a desired angle generation unit 1, a desired angular acceleration calculation unit 2, a desired joint torque output unit 3, a desired joint torque output limiting unit 4, a limit cancellation unit 5, a parameter switching unit 8 serving as one example of a dynamics parameter switching unit, an output error calculation unit 9, a modified desired angular acceleration calculation unit 10, a parameter acquisition unit 14, and the hand control unit 26. The control apparatus 50 (the output error calculation unit 9 of the control apparatus 50) receives, from the robot 20, measurement information obtained by each of the encoders 7.

The desired angle generation unit 1 outputs, to each of the output error calculation unit 9, the desired acceleration calculation unit 2, and the limit cancellation unit 5, a desired joint angle vector $q_d$ for use in enabling a desired operation of the robot 20. The desired operation of the robot 20 includes, in accordance with a task to be achieved, preliminarily recorded desired angle vectors $q_{dt}=[q_{dt1}, q_{dt2}, q_{dt3}]^T (q_{d0}, q_{d1}, q_{d2}, \ldots)$ at respective time points ($t=0, t=t_1, =t_2, \ldots$) and at respective positions. There may be recorded such desired angle vectors as an operation control program for the robot 20 (a program for the control apparatus of the robot). The desired angle generation unit 1 complements the trajectories between the respective adjacent positions by polynomial interpolation in accordance with the information on the angles ($q_{d0}, q_{d1}, q_{d2}, \ldots$) at the respective time points ($t=0, t=t_1, t=t_2, \ldots$) and at the respective positions, and generates a desired joint angle vector $q_d=[q_{d1}, q_{d2}, q_{d3}]^T$. The desired joint angle vector $q_d$ thus generated is transmitted to each of the output error calculation unit 9, the desired acceleration calculation unit 2, and the limit cancellation unit 5.

The output error calculation unit 9 receives the desired joint angle vector $q_d$ transmitted from the desired trajectory generation unit 1 and outputs $q$ from the encoders 7, calculates angular error vectors $q_e = q_d - q$, and transmits, to the modified desired angular acceleration calculation unit 10, the angular error vectors $q_e$ serving as examples of output errors.

The desired angular acceleration calculation unit 2 receives the desired joint angle vector $q_d$ outputted from the desired angle generation unit 1, and calculates a desired angular acceleration $$\ddot{q}_d \quad \text{[Expression 1]}$$

and, transmits the calculated result to the modified desired angular acceleration calculation unit 10.

The modified desired angular acceleration calculation unit 10 receives the output $$\ddot{q}_d \quad \text{[Expression 2]}$$

of the desired angular acceleration calculation unit 2 and the angular error vectors $q_e$ outputted from the output error calculation unit 9, and calculates a modified desired angular acceleration $$\ddot{q}^*_d \quad \text{[Expression 3]}$$

serving as one example of a control command value, and transmits the calculated result to the desired joint torque output unit 3.

The parameter acquisition unit 14 acquires dynamics parameters for the robot 20, and transmits the dynamics parameters thus acquired to the parameter switching unit 8. Examples of the dynamics parameter include the weight, the position of the center of gravity, and an inertia matrix of each of the links of the robot arm 21, or those of the gripped object 30. More specific examples of the dynamics parameter include the weight and the moment of inertia of the gripped object 30 in the cases where the object 30 is gripped by the hand 22 and where the object 30 is released from the hand 22. The necessary dynamics parameters may be preliminarily recorded in a memory that specifically serves as one specific example of the parameter acquisition unit 14, or may be configured by an acquisition unit that is a different specific example of the parameter acquisition unit 14 and acquires a dynamics parameter by communication with a database or the like located outside the robot system 100.

The parameter switching unit 8 switches between the dynamics parameters for the robot 20, each of which is the information necessary for the desired joint torque output unit 3 to generate desired joint torque, and transmits the switched dynamics parameter to the desired joint torque output unit 3.

The parameter switching unit 8 transmits, to the desired joint torque output limiting unit 4, a parameter switch signal indicating that the dynamics parameters are switched therebetween by the parameter switching unit 8.

Examples of the dynamics parameters switched by the parameter switching unit 8 may include a dynamics parameter for a state where there is only the robot main body (the robot arm 21 and the hand 22) with no provision of the object 30 upon gripping the object 30 to be conveyed with the hand 22, and a dynamics parameter for a state where there is also provided the object 30 (where the object 30 and the robot main body (the robot arm 21 and the hand 22) are combined together). The dynamics parameters may be switched therebetween by the parameter switching unit 8 such that the dynamics parameter for the state with the object 30 is replaced by the dynamics parameter for the state only with the robot main body without the object 30 at the timing when the hand 22 releases the conveyed object by releasing and placing the conveyed object 30. Alternatively, the dynamics parameters may be switched therebetween such that the dynamics parameter for the state with the object 30 is replaced by the dynamics parameter for the state only with the robot main body without the object 30 at the timing when the hand 22 grips the object 30 to be conveyed and conveys the same.

The dynamics parameters are switched therebetween by the parameter switching unit 8 based on determination of whether or not the object is gripped or released in accordance with an open/close signal on the hand 22 to be outputted from the hand control unit 26, which is to be described below.

The hand control unit 26 receives an output $q$ from the encoder 7H, and transmits an open/close signal on the hand 22 to each of the parameter switching unit 8 and the robot mechanism 6. The gripped position and the released position are determined preliminarily, and the gripped position is stored in the hand control unit 26. An open/close signal on the hand 22 is outputted in correspondence with the output $q$ of the encoder 7H, when the robot reaches the gripped position or the released position of the hand 22. According to the present embodiment, the gripped position and the released position of the hand are determined preliminarily. However, the present invention is not limited to such a case. Alternatively, the hand 22 may be opened or closed when a person presses a button, for example.

The desired joint torque output unit 3 calculates desired joint torque $\tau_d$, from the modified desired angular acceleration $$\ddot{q}^*_d \quad \text{[Expression 4]}$$

outputted from the modified desired angular acceleration calculation unit 10 and the dynamics parameter outputted from the parameter switching unit 8, and outputs the desired joint torque $\tau_d$ thus calculated. The desired joint torque $\tau_d$ may be calculated with use of the following equation, for example.

$$\tau_d = M(q) \cdot \ddot{q}^*_d + C(q, \dot{q}) + g(q) \quad \text{[Expression 5]}$$

$$M(q) \text{ and } C(q, \dot{q}) \quad \text{[Expression 6]}$$

configure a coefficient matrix including the dynamics parameters for the object 30 and the robot 20.

$$g(q) \quad \text{[Expression 7]}$$

is a gravity term applied to the weights of the object 30 and the robot 20. As exemplified above, the desired joint torque $\tau_d$ is calculated with use of the equation including the dynamics parameter for the object 30. The desired joint torque $\tau_d$ is thus varied step by step due to the switching between the parameters. Because the desired joint torque $\tau_d$ is varied in this manner, the motor driver 24 to be described later causes variation in output torque of the joint driving motor 23. As a result, the robot 20 inevitably operates in some cases despite the fact that the desired joint angle vector $q_d$ is not varied.

The limit cancellation unit 5 receives the desired joint angle vector $q_d$ outputted from the desired angle generation unit 1, and transmits a limit cancellation signal to the desired joint torque output limiting unit 4. The limit cancellation unit 5 may operate as follows, for example. Specifically, the limit cancellation unit 5 may calculate a desired joint angular velocity from the desired joint angle vector $q_d$, to transmit a limit cancellation signal to the desired joint torque output limiting unit 4 in a case where the absolute value of the desired joint angular velocity thus calculated is equal to or more than a predetermined threshold. The limit cancellation unit 5 is configured not to transmit any limit cancellation signal to the desired joint torque output limiting unit 4 in another case where the absolute value of the calculated desired joint angular velocity is less than the threshold.

The limit cancellation unit 5 may calculate the desired joint angular velocity from the desired joint angle vector $q_d$ in the following manner, for example. Initially, the limit cancellation unit 5 stores the desired joint angle vector $q_d=[q_{d1}, q_{d2}, q_{d3}]^T$ at each sampling timing. Assume that the desired joint angle vector at the current sampling timing stored in the limit cancellation unit 5 is expressed as $q_{dn}=[q_{dn1}, q_{dn2}, q_{dn3}]^T$ and that the desired joint angle vector at the most recent sampling timing is expressed as $q_d=[q_{dn-11}, q_{dn-12}, q_{dn-13}]^T$. In this case, the desired joint angular velocity of each of the joints 35A, 35B, and 35C can be approximated by the following equation.

$$\dot{q}_{dni}=(q_{dni}-q_{dn-1i})/T \quad \text{[Expression 8]}$$

In this equation, reference sign i denotes a joint number (i=1, i=2, and i=3 in FIG. 1), and reference sign T denotes a sampling period.

According to this equation, the desired joint angular velocity vector at the sampling period T is expressed as $$\dot{q}_d=[\dot{q}_{d1},\dot{q}_{d2},\dot{q}_{d3}] \quad \text{[Expression 9]}$$

and the magnitude of each of the elements in this vector is regarded as the desired joint angular velocity.

The threshold may be set to 5 [deg/sec], for example. The threshold is set to a value appropriate for the size or the accuracy of the robot 20, safety in view of the influences on the ambient environment, and the like.

The limit cancellation unit 5 outputs a limit cancellation signal when the absolute value of the desired joint angular velocity is equal to or more than the threshold, on the basis of the idea that the object 30 to be gripped by the hand 22 is stopped as well as the idea that the robot arm 21 is stopped at one position before to after the hand 22 grips the object 30, in order that the hand 22 safely grip the object 30. With these ideas, the desired joint angle vector $q_d$ is assumed to be equal to or less than a certain threshold before to after the hand 22 grips the object, in order to achieve such a desired stopped state. Therefore, the limit cancellation unit 5 needs to transmit a limit cancellation signal to the desired joint torque output limiting unit 4 when the desired joint angle vector $q_d$ starts to be varied so that the hand 22 grips the object 30 and the robot arm 21 starts to operate again.

The desired joint torque output limiting unit 4 receives the desired joint torque $\tau_d$ outputted from the desired joint torque output unit 3, the limit cancellation signal outputted from the limit cancellation unit 5, and the parameter switch signal outputted from the parameter switching unit 8, and outputs modified desired joint torque $$\hat{\tau}_d \quad \text{[Expression 10]}$$

serving as a control desired for each of the joints 35A, 35B, and 35C.

When the desired joint torque output limiting unit 4 receives a parameter switch signal in a state where no limit cancellation signal is received, the desired joint torque output limiting unit 4 maintains the value of the desired joint torque $\tau_d$ immediately before the receipt of the parameter switch signal until a subsequent limit cancellation signal is received. The desired joint torque output limiting unit 4 transmits the value of the desired joint torque $\tau_d$ as the modified desired joint torque $$\hat{\tau}_d \quad \text{[Expression 11]}$$

to the robot mechanism 6. In the period other than the above, the desired joint torque output limiting unit 4 simply transmits the value of the current desired joint torque $\tau_d$ as the modified desired joint torque $$\hat{\tau}_d \quad \text{[Expression 12]}$$

to the robot mechanism 6.

Figure 3:
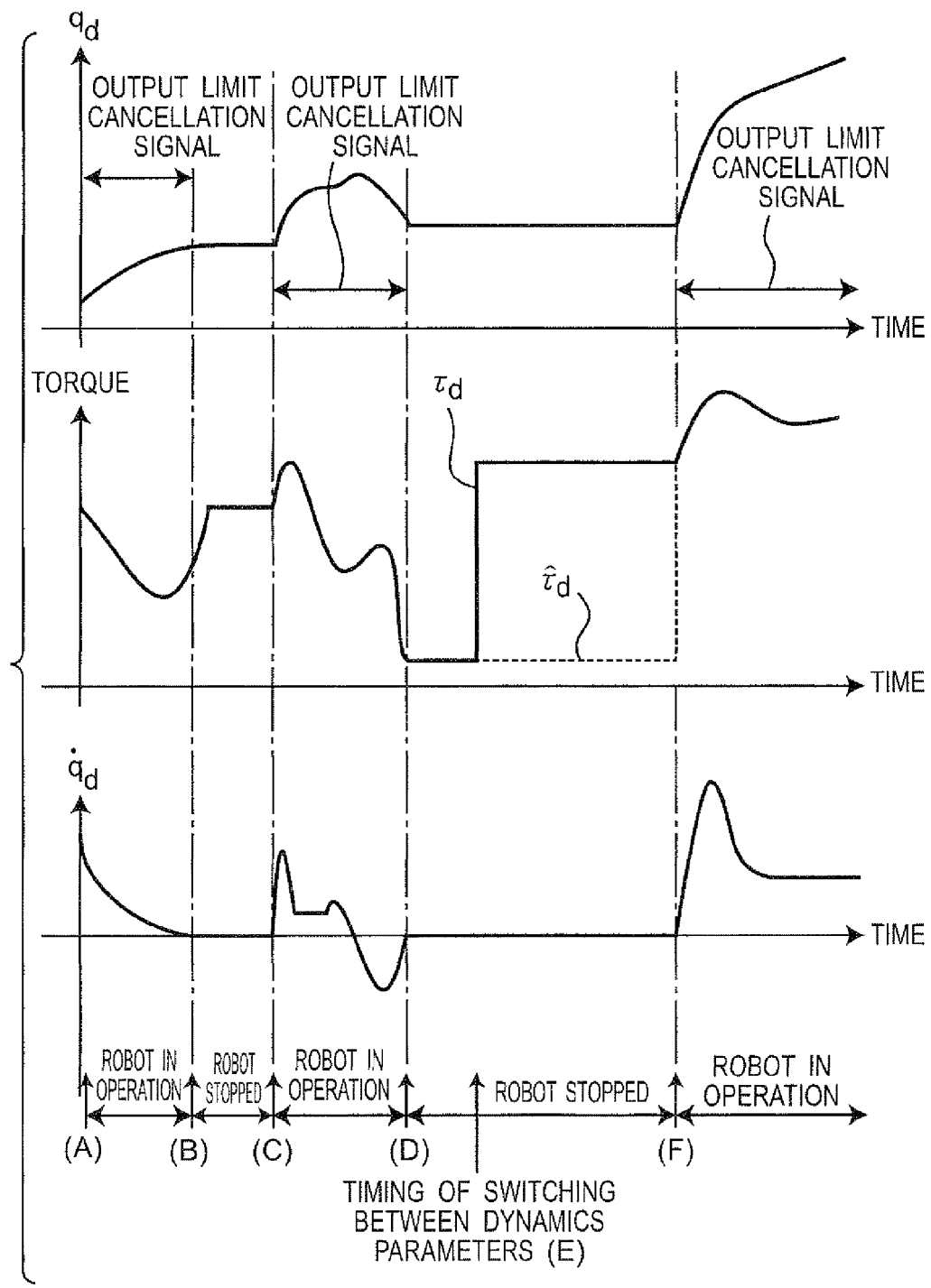
FIG. 3 is a view exemplarily indicating operations of a desired torque output limiting unit according to the first embodiment of the present invention.

FIG. 3 is a view showing examples of the operations of the desired joint torque output limiting unit 4. This view exemplarily indicates the values of the desired joint angle, the desired joint torque, and the modified desired joint torque of the first joint shaft 35-1. It is noted that similar illustration is applicable to each of the remaining joint shafts 35-2 and 35-3.

In the period from (A) to (D) on the horizontal axis (temporal axis) in FIG. 3, the hand 22 does not grip the object 30. The robot arm 21 is in operation in the period from (A) to (B) and the period from (C) to (D). On the other hand, the robot arm 21 is stopped in the period from (B) to (C).

In the period from (D) to (F), the robot arm 21 is stopped in order to grip the object 30 with the hand 22. The hand 22 grips the object 30 in this period from (D) to (E). The dynamics parameters are switched therebetween at the time point (E), and the robot arm 21 starts to operate from the stopped state at the time point (F).

In each of the period from the time point (A) to the time point (B) and the period from the time point (C) to the time point (D) in FIG. 3, the desired joint torque output limiting unit 4 receives a limit cancellation signal from the limit cancellation unit 5. Accordingly, the desired joint torque output limiting unit 4 simply outputs the desired joint torque $\tau_d$ transmitted from the desired joint torque output unit 3, as the modified desired joint torque.

In the period from the time point (B) to the time point (C) and the period from the time point (D) to the time point (E), no limit cancellation signal is transmitted from the limit cancellation unit 5 to the desired joint torque output limiting unit 4. Furthermore, no dynamics parameter switch signal is either transmitted from the parameter switching unit 8 to the desired joint torque output limiting unit 4 in these periods. Accordingly, the desired joint torque output limiting unit 4 simply outputs the desired joint torque $\tau_d$ transmitted from the desired joint torque output unit 3, as the modified desired joint torque.

At the time point (E), the desired joint torque output limiting unit 4 receives a dynamics parameter switch signal from the parameter switching unit 8. At the same time, the desired joint torque output unit 3 receives the switched dynamics parameter from the parameter switching unit 8. The desired joint torque output unit 3 calculates desired joint torque $\tau_d$ from the dynamics parameter thus received. Accordingly, the desired joint torque $\tau_d$ is varied at the time point (E). However, the desired joint torque output limiting unit 4 receives a dynamics parameter switch signal from the parameter switching unit 8 but does not receive any limit cancellation signal from the limit cancellation unit 5 at the same timing. Therefore, at the time point (E), the value of the desired joint torque $\tau_d$ immediately before the receipt of the dynamics parameter switch signal is maintained and outputted as the modified desired joint torque.

Until the desired joint torque output limiting unit 4 receives a limit cancellation signal from the limit cancellation unit 5 at the time point (F), the desired joint torque output limiting unit 4 repetitively outputs the same value as the value of the modified desired joint torque. The desired joint torque output limiting unit 4 receives a limit cancellation signal from the limit cancellation unit 5 at the time point (F). Therefore, from the time point (F), the desired joint torque output limiting unit 4 outputs again, as the value of the modified desired joint torque $$\hat{\tau}_d, \quad \text{[Expression 13]}$$

a value identical with that of the desired joint torque $\tau_d$ transmitted from the desired joint torque output unit 3 to the desired joint torque output limiting unit 4. Accordingly, the value of the modified desired joint torque $$\hat{\tau}_d \quad \text{[Expression 14]}$$

is not varied as long as the amount of variation of the desired joint angle vector $q_d$ of the robot arm 21 is less than the threshold. It is thus possible to prevent any operation of the robot 20 only by the switching between the dynamics parameters. Furthermore, when the desired joint angle vector $q_d$ starts to vary, the value of the modified desired joint torque $$\hat{\tau}_d \quad \text{[Expression 15]}$$

is varied promptly, so that the robot 20 can start an operation.

With reference again to FIG. 2, the value of the modified desired joint torque $$\hat{\tau}_d \quad \text{[Expression 16]}$$

is transmitted, as a torque desired value, from the desired joint torque output limiting unit 4 to the motor driver 24 by way of the input/output IF 41 such as the D/A board. The motor driver 24 drives to rotate positively or negatively the motors 23 mounted at the respective joint shafts 35 in an independent manner, so that the robot mechanism 6 is caused to operate.

As the robot mechanism 6 operates, the joint angles of the robot arm 21 of the robot 20 are varied, respectively. The detected results obtained by the encoders 7 for respectively detecting the joint angles q are transmitted to the output error calculation unit 9 by way of the input/output IF 41.

As having been described, the control apparatus 50 according to the first embodiment includes the parameter switching unit 8, the limit cancellation unit 5, and the desired joint torque output limiting unit 4. The robot 20 is therefore configured such that the torque of each of the motors 23 is controlled, as an example of control on actuators for driving to rotate positively or negatively the joints 35A, 35B, and 35C of the robot 20. The output of the desired joint torque from the desired joint torque output unit 3 is limited by the desired joint torque limiting unit 4 after the parameter switching unit 8 switches between the dynamics parameters. As a result, it is possible to prevent any operation of the robot 20 due to the switching between the dynamics parameters despite the fact that a stop desired value is provided to the robot 20. The robot 20 can be kept stopped even when the dynamics parameter is widely varied in order to grip the object 30, for example. It is therefore possible to safely control the operations of the robot 20.

In the control apparatus and the control method for a robot, as well as the robot and the control program therefor according to the first embodiment of the present invention, even if the dynamics parameters such as the weight including that of the object 30 or the moment of inertia are switched therebetween when the robot 20 grips or releases the object 30, the output of the desired joint torque from the desired joint torque output unit 3 can be limited by the desired joint torque output limiting unit 4 or the limitation by the desired joint torque output limiting unit 4 can be cancelled by the limit cancellation unit 5. In this manner, the robot 20 can be controlled so as to be kept stopped.

Second Embodiment

Figure 4:
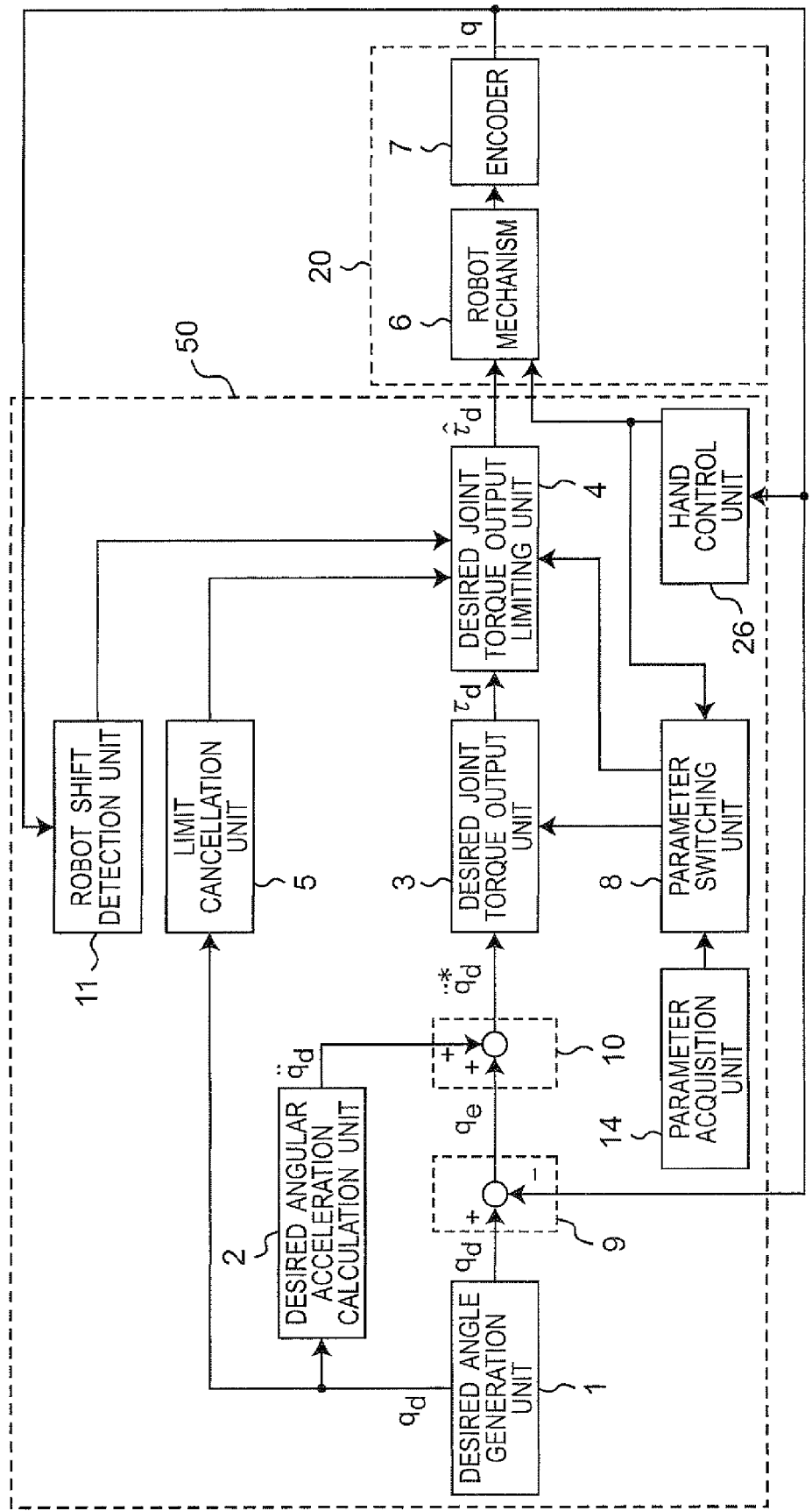
FIG. 4 is a block diagram showing a control apparatus for a robot and a part of the robot to be controlled, according to a second embodiment of the present invention.

FIG. 4 is a block diagram showing a control apparatus 50 for a robot 20 and a part of the robot 20 to be controlled, according to a second embodiment of the present invention. The control apparatus 50 includes a desired angle generation unit 1, a desired angular acceleration calculation unit 2, a desired joint torque output unit 3, a desired joint torque output limiting unit 4, a limit cancellation unit 5, a parameter switching unit 8, an output error calculation unit 9, a modified desired angular acceleration calculation unit 10, a parameter acquisition unit 14, and a robot shift detection unit 11. Similarly to the first embodiment, the robot 20 includes a robot mechanism 6, motors 23 and 23H, and encoders 7 and 7H. The control apparatus 50 receives, from the robot 20, measurement information obtained by each of the encoders 7 and 7H.

In the second embodiment, mainly described are differences in configuration and function from the first embodiment. The configurations and functions same as those of the first embodiment will be omitted.

Results detected by the encoders 7 for detecting joint angles q are transmitted to each of the output error calculation unit 9 and the robot shift detection unit 11 by way of an input/output IF 41.

The robot shift detection unit 11 receives the joint angles q outputted respectively from the encoders 7, and transmits a shift detection signal to the desired joint torque output limiting unit 4. Such a shift detection signal is transmitted from the robot shift detection unit 11 to the desired joint torque output limiting unit 4 in a case where the robot shift detection unit 11 determines that the robot 20 is shifting. The determination that the robot is shifting can be made by the robot shift detection unit 11 when, for example, the absolute value of a differential value of the joint angle q is equal to or more than a threshold.

The desired joint torque output limiting unit 4 receives desired joint torque $\tau_d$ outputted from the desired joint torque output unit 3, a limit cancellation signal outputted from the limit cancellation unit 5, a parameter switch signal outputted from the parameter switching unit 8, and a shift detection signal outputted from the robot shift detection unit 11, and the desired joint torque output limiting unit 4 outputs modified desired joint torque $$\hat{\tau}_d \quad \text{[Expression 17]}$$

serving as a control desired for each of joints 35A, 35B, and 35C.

The modified desired joint torque $$\hat{\tau}_d \quad \text{[Expression 18]}$$

is outputted, when the desired joint torque output limiting unit 4 receives no limit cancellation signal from the limit cancellation unit 5 but the desired joint torque output limiting unit 4 receives a parameter switch signal from the parameter switching unit 8, by gradually changing values from the value of the desired joint torque immediately before the receipt of the parameter switch signal to the value of the current desired joint torque, until the desired joint torque output limiting unit 4 receives a subsequent shift detection signal from the robot shift detection unit 11.

When the desired joint torque output limiting unit 4 receives the subsequent shift detection signal from the robot shift detection unit 11, the desired joint torque output limiting unit 4 maintains the value of the modified desired joint torque at the moment and outputs the maintained value as the modified desired joint torque $$\hat{\tau}_d \quad \text{[Expression 19]}$$

until a subsequent limit cancellation signal is received. The desired joint torque output limiting unit 4 simply outputs the value of the current desired joint torque $\tau_d$ as the modified desired joint torque $$\hat{\tau}_d \quad \text{[Expression 20]}$$

in the period other than the above.

Figure 5:
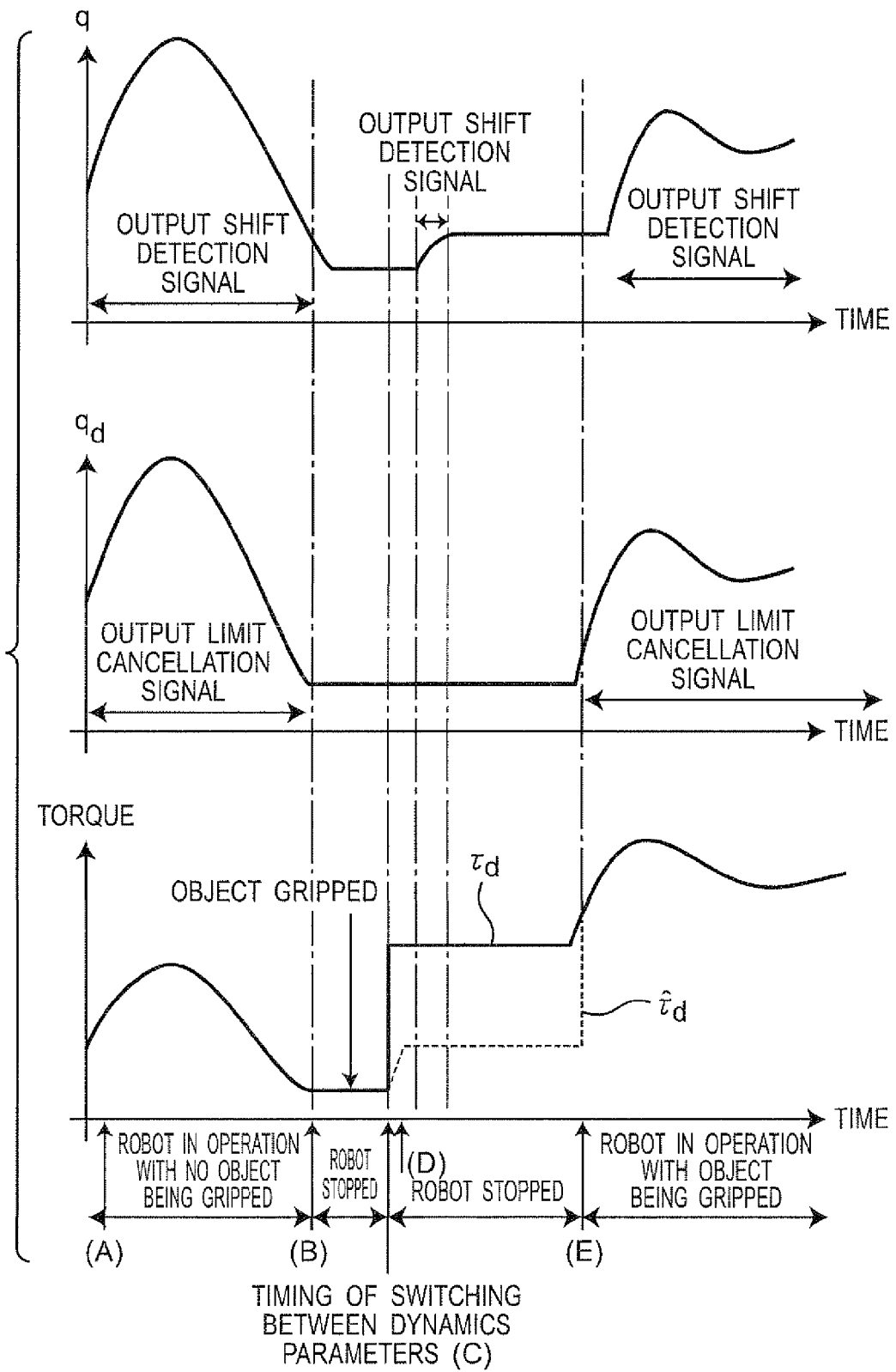
FIG. 5 is a view exemplarily indicating operations of a desired torque output limiting unit according to the second embodiment of the present invention.

FIG. 5 is a view showing examples of the operations of the desired joint torque output limiting unit 4. This view exemplarily indicates the values of the desired joint angle, the desired joint torque, and the modified desired joint torque of a first joint shaft 35-1. It is noted that similar illustration is applicable to each of remaining joint shafts 35-2 and 35-3.

In the period from (A) to (B) on the horizontal axis (temporal axis) in FIG. 5, the hand 22 does not grip an object 30, while a robot arm 21 is in operation.

In the period from (B) to (E), the robot arm 21 is stopped in order to grip the object 30 with the hand 22. The hand 22 grips the object 30 in the period from (B) to (C) in the above duration. Dynamics parameters are switched therebetween at the time point (C), and the desired joint torque output limiting unit 4 starts to receive a shift detection signal from the robot shift detection unit 11 at the time point (D). The robot arm 21 starts to operate from the stopped state at the time point (E).

In each of the period from the time point (A) to the time point (B) and the period from the time point (B) to the time point (C) in FIG. 5, the desired joint torque output limiting unit 4 simply outputs the desired joint torque $\tau_d$ transmitted from the desired joint torque output unit 3, as the modified desired joint torque.

At the time point (C), the desired joint torque output limiting unit 4 receives a dynamics parameter switch signal from the parameter switching unit 8. At the same time, the desired joint torque output unit 3 receives the switched dynamics parameter. The desired joint torque output unit 3 calculates desired joint torque $\tau_d$ from the dynamics parameter thus received. Accordingly, the desired joint torque $\tau_d$ is varied at the time point (C). However, the desired joint torque output limiting unit 4 receives a dynamics parameter switch signal from the parameter switching unit 8 but does not receive any limit cancellation signal from the limit cancellation unit 5 at the same timing. Therefore, in the period from the time point (C) to the time point (D), the desired joint torque output limiting unit 4 gradually changes values from the value of the desired joint torque $\tau_d$ immediately before the receipt of the dynamics parameter switch signal at the time point (C) to the value of the current desired joint torque, to output the obtained value as the modified desired joint torque.

At the time point (D), the desired joint torque output limiting unit 4 receives a shift detection signal from the robot shift detection unit 11. Accordingly, the desired joint torque output limiting unit 4 stops gradual change in order to obtain the value of the modified desired joint torque to be outputted. As a result, the value of the modified desired joint torque has a constant value with no variation. The robot 20 thus stops the actual operations, so that the robot shift detection unit 11 stops outputting a shift detection signal.

In the period from the time point (D) to the time point (E), the desired joint torque output limiting unit 4 maintains the value of the modified desired joint torque at the time point (D) and outputs the same.

The desired joint torque output limiting unit 4 receives a limit cancellation signal from the limit cancellation unit 5 at the time point (E). Therefore, from the time point (E), the desired joint torque output limiting unit 4 outputs again, as the value of the modified desired joint torque $$\hat{\tau}_d \quad \text{[Expression 21]}$$

a value identical with that of the desired joint torque $\tau_d$ transmitted from the desired joint torque output unit 3 to the desired joint torque output limiting unit 4.

As having been described, in the control apparatus 50 according to the second embodiment, the desired joint torque output limiting unit 4 limits the output of the desired joint torque from the desired joint torque output unit 3 after the parameter switching unit 8 switches between the dynamics parameters. As a result, it is possible to prevent any operation of the robot 20 due to the switching between the dynamics parameters despite the fact that a stop desired value is provided to the robot 20. Furthermore, there is provided the robot shift detection unit 11 that detects whether or not the robot 20 is shifting. The desired joint torque output limiting unit 4 outputs the modified desired joint torque in accordance with a shift detection signal transmitted from the robot shift detection unit 11. Therefore, the robot 20 can be kept stopped with no excessive limitation on the desired joint torque and also upon significant variation in dynamics parameter, which realizes safe control on the operations of the robot 20.

Third Embodiment

Figure 6:
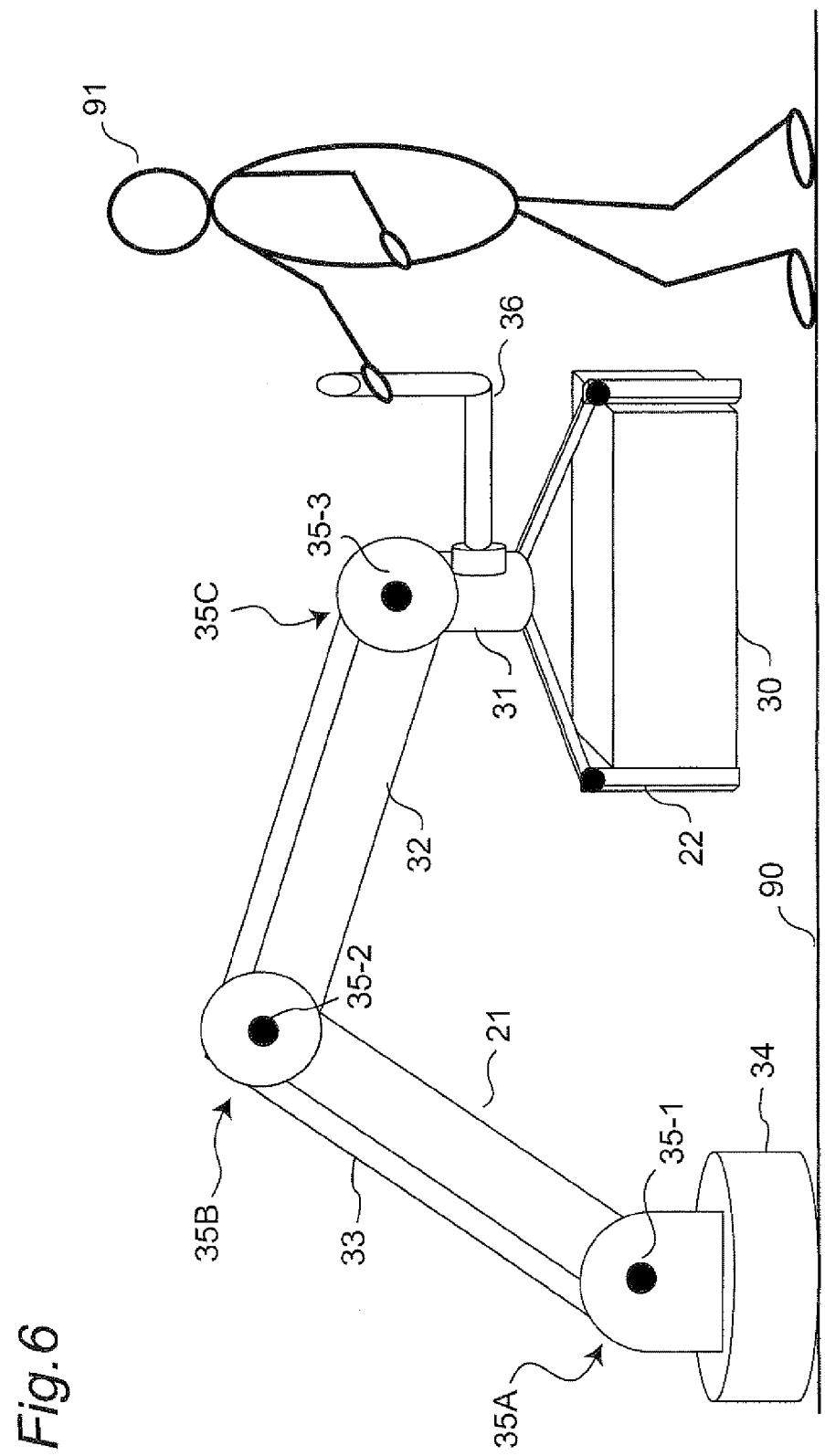
FIG. 6 is a view showing an outline of the configuration of a robot according to a third embodiment of the present invention.

FIG. 6 is a view showing an outline of the configuration of a robot 20 according to a third embodiment of the present invention. When a person 91 grips a handle 36, which may have an L letter shape as one example and has an end fixed to a third link 31, and applies force in a direction where the person wants to convey an object 30, the robot 20 is shifted while gripping the object 30 with a hand 22, so that the object 30 can be conveyed by the robot 20. The present embodiment is different from the preceding embodiments in that the robot 20 includes the handle 36 operated by the person 91, and a force detection unit 25 (such as a force sensor) for detecting force applied to the handle 36 by the person 91.

Also in the third embodiment, mainly described are differences in configuration and function from the first embodiment. The configurations and functions same as those of the first embodiment will be omitted.

Figure 7:
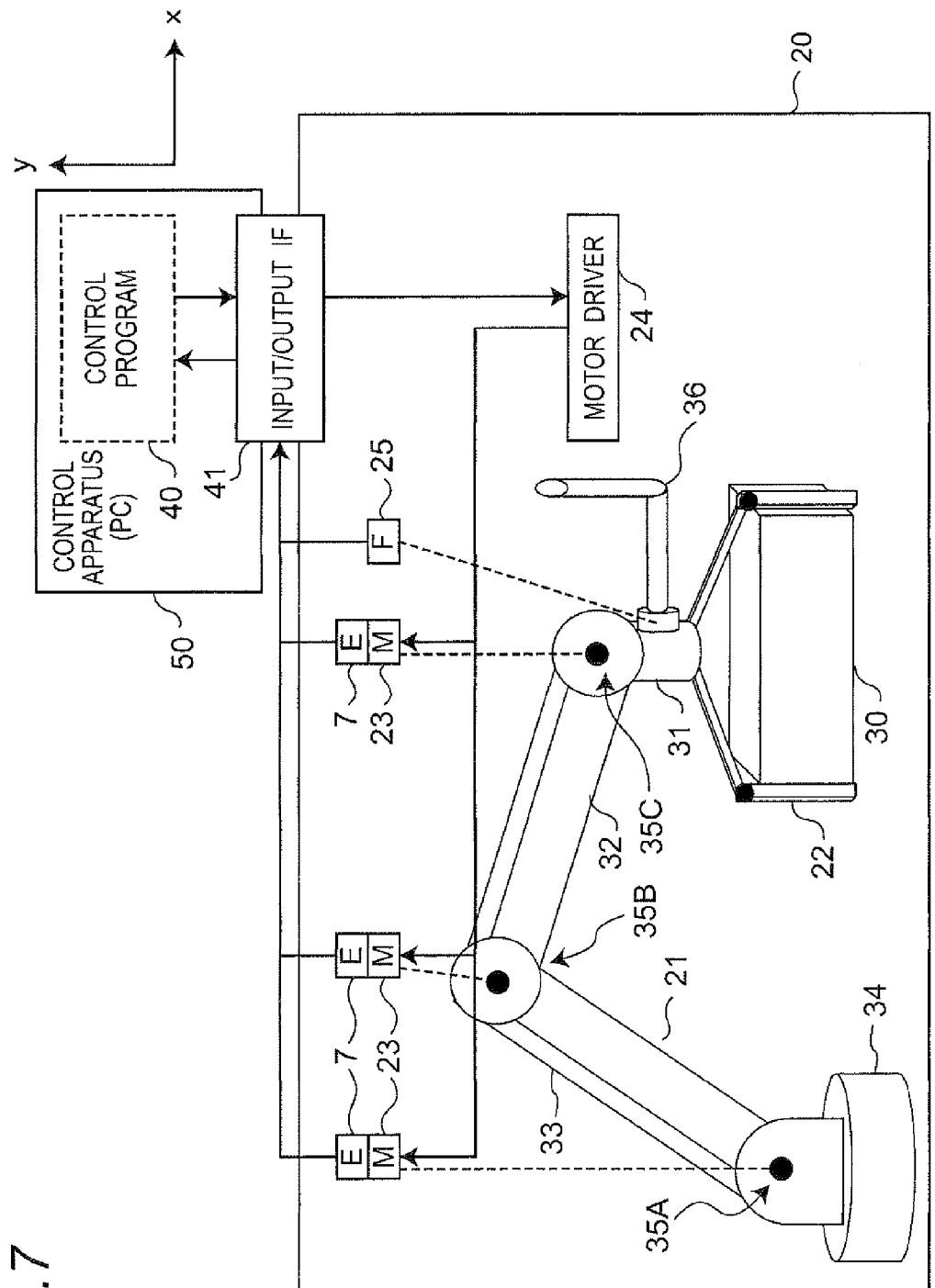
FIG. 7 is a view showing the configuration of a robot system according to the third embodiment of the present invention.

FIG. 7 is a view showing the configuration of a robot system 100. As described earlier, the robot system 100 further includes the handle 36 and the force detection unit 25. Force of the person 91 detected by the force detection unit 25 is transmitted to a control apparatus 50 (a limit cancellation unit 5 and a force control unit 12 in the control apparatus 50) by way of an input/output IF 41.

Figure 8:
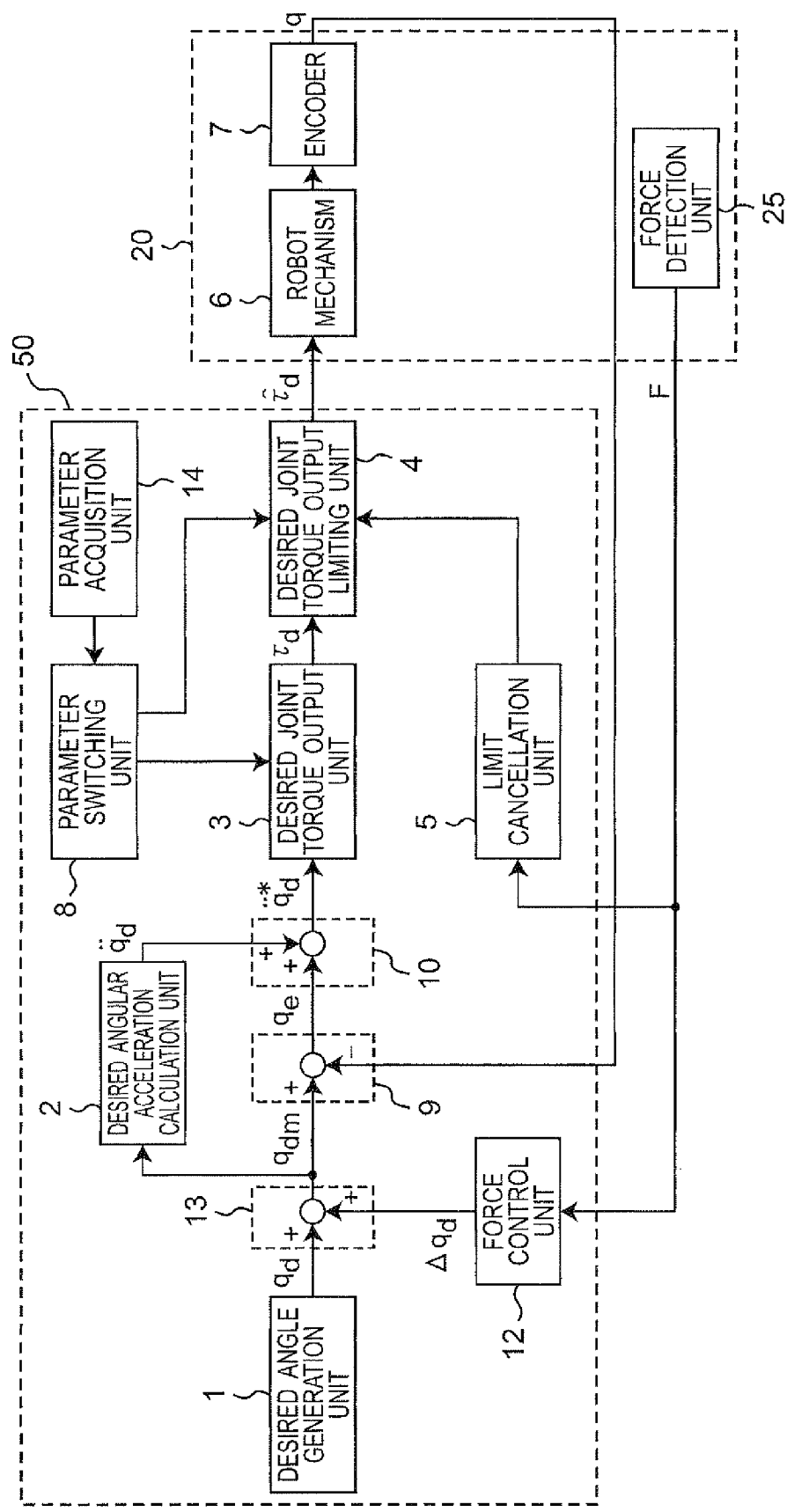
FIG. 8 is a block diagram showing a control apparatus for a robot and a part of the robot to be controlled, according to the third embodiment of the present invention.

FIG. 8 is a block diagram of the control apparatus 50 for the robot 20 and a part of the robot 20 to be controlled. In comparison with the configuration according to the first embodiment, the control apparatus 50 additionally includes the force control unit 12 and a desired angle addition unit 13.

The force detection unit 25 detects or estimates force generated between the handle 36 and the robot 20, and outputs information F thereon. As one example, the force detection unit 25 is a three-axis force sensor that is located between the handle 36 and the robot 20. The information F detected by the force sensor is transmitted to each of the limit cancellation unit 5 and the force control unit 12.

The force control unit 12 transmits a corrected desired angle vector $\Delta q_d$ to the desired angle addition unit 13 in accordance with the force information outputted from the force detection unit 25. The force control unit 12 calculates the corrected desired angle vector $\Delta q_d$ in accordance with a force control method such as the impedance control method, the compliance control method, or the like.

A desired angle generation unit 1 transmits, to the desired angle addition unit 13, a desired joint angle vector $q_d$ for use in enabling a desired operation of the robot 20.

The desired angle addition unit 13 receives the desired joint angle vector $q_d$ outputted from the desired trajectory generation unit 1 and the corrected desired angle vector $\Delta q_d$ outputted from the force control unit 12, calculates a modified desired angle vector $q_{dm} = q_d + \Delta q_d$, and transmits the modified desired angle vector $q_{dm}$ thus calculated to each of a desired angular acceleration calculation unit 2 and an output error calculation unit 9.

The output error calculation unit 9 receives the modified desired angle vector $q_{dm}$ outputted from the desired angle addition unit 13 and outputs q of encoders 7, calculates angular error vectors $q_e = q_{dm} - q$, and transmits, to a modified desired angular acceleration calculation unit 10, the angular error vectors $q_e$ serving as examples of output errors.

On the other hand, the limit cancellation unit 5 receives the force information F outputted from the force detection unit 25, and transmits a limit cancellation signal to a desired joint torque output limiting unit 4. As one example, the limit cancellation unit 5 may be configured to transmit a limit cancellation signal to the desired joint torque output limiting unit 4 in a case where the force information F is equal to or more than a predetermined threshold, and not to transmit any limit cancellation signal to the desired joint torque output limiting unit 4 in another case where the force information F is less than the threshold. In this configuration, the limit cancellation unit 5 transmits a limit cancellation signal to the desired joint torque output limiting unit 4 when the person 91 applies force to the handle 36 in order to operate the robot 20. On the other hand, the limit cancellation unit 5 does not transmit any limit cancellation signal to the desired joint torque output limiting unit 4 when the person 91 does not apply force to the handle 36. As a result, the robot 20 according to the third embodiment can be configured to be in operation while the person 91 applies force to the robot 20, and to be stopped while the person 91 applies no force to the robot 20. Because the robot 20 may be in the stopped state when the person 91 does not apply force, no limit cancellation signal is transmitted from the limit cancellation unit 5 to the desired joint torque output limiting unit 4.

The desired joint torque output limiting unit 4 operates similarly to that of the first embodiment.

As having been described, the control apparatus 50 according to the third embodiment is provided with the force control unit 12 for the robot 20 including the force detection unit 25, so that the robot 20 gripping the object 30 can be shifted in accordance with the force applied by the person 91 so as to convey the object 30. Furthermore, the force detection unit 25 can detect whether or not force is applied by the person 91, and the limit cancellation unit 5 outputs a limit cancellation signal in accordance with the force information on the person 91. The robot 20 therefore starts to operate only after the person 91 tries to operate the robot subsequently to the switching between the dynamics parameters, which achieves safe control on the robot 20.

Each of the first to third embodiments has exemplified the robot 20 driven by the motors 23 as examples of the actuators for the robot 20. However, the actuators are not limited to the motors 23. The present invention exerts similar effects even with use of actuators driven by pneumatic pressure or hydraulic pressure.

Each of the first to third embodiments has exemplified the three-axis robot arm 21. However, the present invention is not limited to this example. The number of the axes is not limited to this case. Furthermore, this configuration does not need to be applied equally to each of the axes, but may be applied only to a limited number of the axes. For example, with respect to the direction of gravity applied to the object 30 to be gripped, the robot arm 21 gripping the object 30 needs to be prevented from collectively dropping by adopting a dynamics parameter for the case of including the object 30 from the moment the object is gripped. Meanwhile, with respect to the horizontal direction, the robot arm may be in some cases desired not to operate from the moment the object is gripped, but may be desired to start operating only after the object is gripped and then the desired position is changed. In such cases, a desired operation is realized not by applying the configuration according to any one of the first to third embodiments to an axis shifting in the direction of gravity but by applying only to an axis shifting in the horizontal direction.

Figure 9:
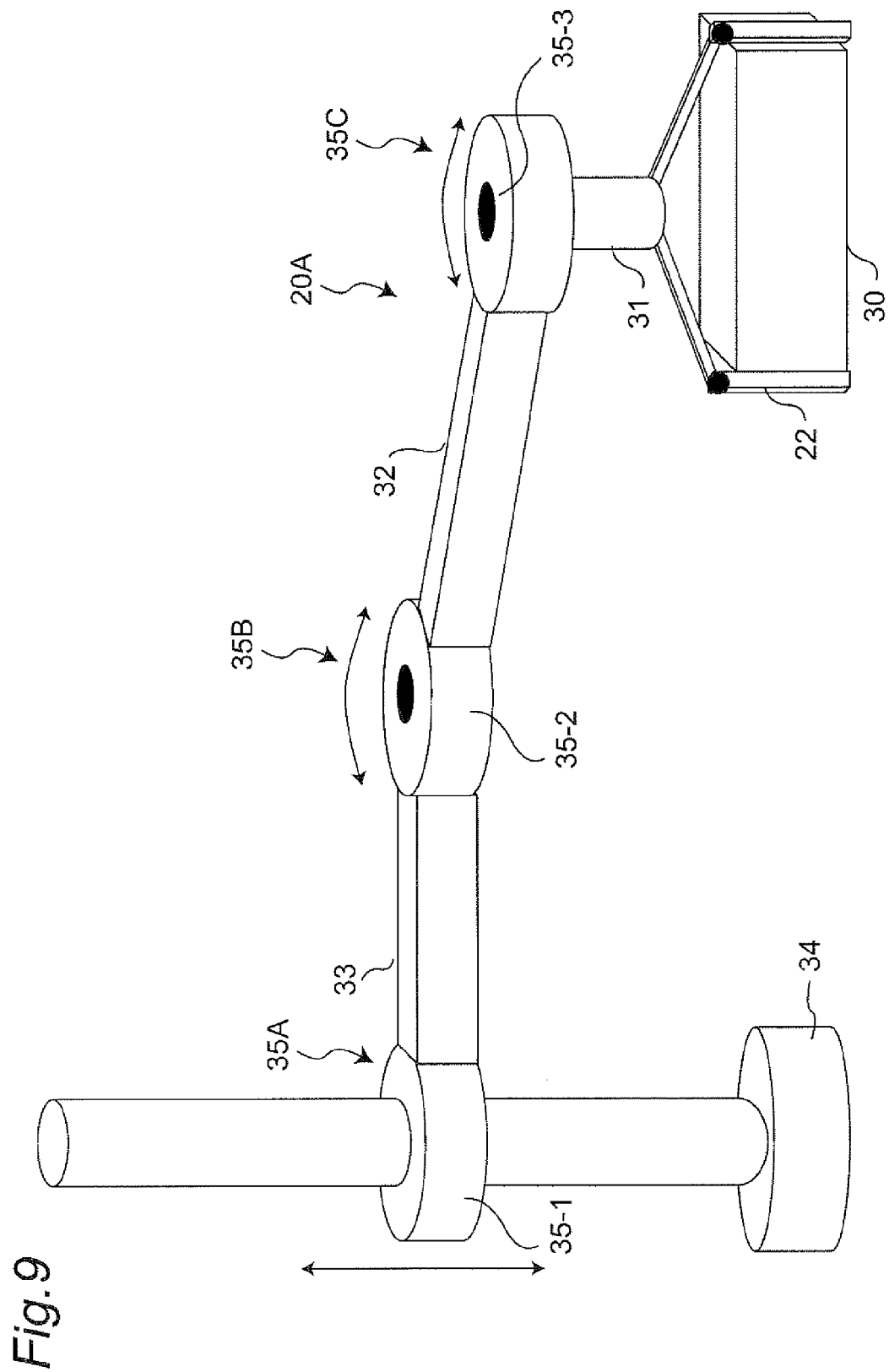
FIG. 9 is a view exemplarily showing a robot in which an axis moving in the direction of gravity and an axis moving in the horizontal direction are separated from each other in the first to third embodiments of the present invention.

FIG. 9 shows one example of a robot 20A of a type called the scalar type, in which an axis moving in the direction of gravity is separated from axes moving in the horizontal direction. A desired operation can be realized by applying only to the axes moving in the horizontal direction.

Though the present invention has been described above based on the above first to third embodiments, the present invention should not be limited to the above-described first to third embodiments. For example, the present invention also includes the following cases.

Each of the above-described apparatuses is actually a computer system that includes, for example, a microprocessor, ROM, RAM, hard disk unit, display unit, keyboard, and mouse. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

In other words, in each of the above-mentioned embodiments, each component may be composed of dedicated hardware, or implemented by executing programs for components feasible with software. Each component can be implemented as a result that a program executing unit such as a CPU reads and executes software programs recorded in a recording medium such as a hard disk or semiconductor memory. Here, software that implements an information-processing device according to each of the above-mentioned embodiments is a following program. That is to say, this program has a computer execute the units/steps defined in claims. The program has a computer execute the units/steps defined in claims. That is, such a program is a control program for a control apparatus of a robot including a joint, causing a computer to function as:
  a dynamics parameter acquisition unit that acquires a plurality of dynamics parameters for the robot and an object gripped by the robot;
  a desired joint torque output unit that outputs a desired value of torque of the joint of the robot as a desired joint torque;
  a dynamics parameter switching unit that switches between the plurality of dynamics parameters acquired by the dynamics parameter acquisition unit;
  a desired joint torque output limiting unit that limits the output of the desired joint torque from the desired joint torque output unit after the dynamics parameter switching unit switches between the dynamics parameters; and
  a limit cancellation unit that cancels the limitation by the desired joint torque output limiting unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiments can be produced.

The control apparatus and the control method for a robot, as well as the robot and the control program therefor according to the present invention are useful as a control apparatus, a control method, and a control program for use in positional control, such as control on a positional trajectory of positions of an arm tip of a robot, like a robot arm for gripping an object. Not limited to such a robot arm, they are also applicable as a control apparatus, a control method, a robot, and a control program for an apparatus that includes a mechanism for gripping an object in a production plant or the like.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for a robot comprising a joint, the control apparatus comprising:
  a control apparatus computer configured to operate as:
  a dynamics parameter acquisition unit that acquires a plurality of dynamics parameters for the robot and an object gripped by the robot;
  a desired joint torque output unit that outputs, as a desired joint torque, a desired value of torque of the joint of the robot;
  a dynamics parameter switching unit that switches between the plurality of dynamics parameters acquired by the dynamics parameter acquisition unit;
  a desired joint torque output limiting unit that limits an output of the desired joint torque from the desired joint torque output unit after the dynamics parameter switching unit switches between the dynamics parameters; and
  a limit cancellation unit that cancels a limitation by the desired joint torque output limiting unit,
  wherein, immediately after the dynamics parameters are switched, the desired joint torque output limiting unit maintains the output of the desired joint torque from the desired joint torque output unit to a value immediately before the dynamics parameters are switched.

2. The control apparatus for a robot according to claim 1, further comprising:
  a desired angle generation unit that generates and outputs a desired joint angle vector that is used to achieve a desired operation of the robot,
  wherein the desired joint angle vector outputted from the desired angle generation unit is used when the desired joint torque output unit outputs the desired value of the torque of the joint of the robot as the desired joint torque, and the limit cancellation unit cancels the limitation on the output of the desired joint torque from the desired joint torque output unit when determined that a desired position of the robot is changed in accordance with the desired joint angle vector outputted from the desired angle generation unit.

3. The control apparatus for a robot according to claim 1, wherein
  the limit cancellation unit further comprises a force detection unit that detects force externally applied to the robot, and
  the force detection unit cancels the limitation on the output of the desired joint torque from the desired joint torque output unit when the force detection unit detects a force of a magnitude equal to or more than a threshold.

4. A control apparatus for a robot comprising a joint, the control apparatus comprising:
  a dynamics parameter acquisition unit that acquires a plurality of dynamics parameters for the robot and an object gripped by the robot;
  a desired joint torque output unit that outputs, as a desired joint torque, a desired value of torque of the joint of the robot;
  a dynamics parameter switching unit that switches between the plurality of dynamics parameters acquired by the dynamics parameter acquisition unit;
  a desired joint torque output limiting unit that limits an output of the desired joint torque from the desired joint torque output unit after the dynamics parameter switching unit switches between the dynamics parameters; and
  a limit cancellation unit that cancels a limitation by the desired joint torque output limiting unit; and
  a robot shift detection unit that detects a shift of the robot,
  wherein the desired joint torque output limiting unit maintains the desired joint torque outputted from the desired joint torque output unit at a moment when the robot shift detection unit detects the shift of the robot.

5. A control apparatus for a robot comprising a joint, the control apparatus comprising:
  a dynamics parameter acquisition unit that acquires a plurality of dynamics parameters for the robot and an object gripped by the robot;
  a desired joint torque output unit that outputs, as a desired joint torque, a desired value of torque of the joint of the robot;
  a dynamics parameter switching unit that switches between the plurality of dynamics parameters acquired by the dynamics parameter acquisition unit;
  a desired joint torque output limiting unit that limits an output of the desired joint torque from the desired joint torque output unit after the dynamics parameter switching unit switches between the dynamics parameters; and a limit cancellation unit that cancels a limitation by the desired joint torque output limiting unit, wherein the dynamics parameter switching unit comprises an object grip detection unit that detects that the object is gripped by the robot, and the dynamics parameter switching unit switches between the dynamics parameters after the object grip detection unit detects that the object is gripped.

6. A robot comprising:

the control apparatus according to claim 1 for the robot;

a robot arm including the joint; and a hand that is supported at a distal end of the robot arm and capable of gripping the object.

7. A method of controlling a robot including a joint, the method comprising:

acquiring, by a dynamics parameter acquisition unit, a plurality of dynamics parameters for the robot and an object gripped by the robot;

outputting, from a desired joint torque output unit, a desired value of torque of the joint of the robot as a desired joint torque;

switching, by a dynamics parameter switching unit, between the plurality of the dynamics parameters acquired by the dynamics parameter acquisition unit;

limiting, by a desired joint torque output limiting unit, the output of the desired joint torque from the desired joint torque output unit after the dynamics parameter switching unit switches between the dynamics parameters; and canceling, by a limit cancellation unit, the limitation by the desired joint torque output limiting unit, wherein, immediately after the dynamics parameters are switched, the desired joint torque output limiting unit maintains the output of the desired joint torque from the desired joint torque output unit to a value immediately before the dynamics parameters are switched.

8. A method of controlling a robot including a joint, the method comprising:

acquiring, by a dynamics parameter acquisition unit, a plurality of dynamics parameters for the robot and an object gripped by the robot;

outputting, from a desired joint torque output unit, a desired value of torque of the joint of the robot as a desired joint torque;

switching, by a dynamics parameter switching unit, between the plurality of the dynamics parameters acquired by the dynamics parameter acquisition unit;

limiting, by a desired joint torque output limiting unit, the output of the desired joint torque from the desired joint torque output unit after the dynamics parameter switching unit switches between the dynamics parameters; and canceling, by a limit cancellation unit, the limitation by the desired joint torque output limiting unit, wherein when switching by a dynamics parameter switching unit, it is detected by an object grip detection unit that the object is gripped by the robot, and the dynamics parameter switching unit switches between the dynamics parameters after the object grip detection unit detects that the object is gripped.

* * * * *